United States Patent [19]

Roberts

[11] 3,717,549
[45] Feb. 20, 1973

[54] FERMENTATION PROCESS FOR THE PRODUCTION OF CITRIC ACID

[75] Inventor: Foy F. Roberts, Stonington, Conn.
[73] Assignee: Pfizer Inc., New York, N.Y.
[22] Filed: Feb. 9, 1971
[21] Appl. No.: 113,864

Related U.S. Application Data

[63] Continuation of Ser. No. 690,375, Dec. 14, 1967, abandoned.

[52] U.S. Cl. .................................................. 195/37
[51] Int. Cl. .............................................. C12d 1/04
[58] Field of Search .......................... 195/36, 37, 47

[56] References Cited

UNITED STATES PATENTS 2,993,838  7/1961  Kinoshita et al. ...................... 195/36

FOREIGN PATENTS OR APPLICATIONS 20,707  9/1968  Japan

OTHER PUBLICATIONS

Kudryavtsev et al., Chem. Abs. Vol. 58, No. 763, 1963
Beguet et al., Chem. Abs. Vol. 58, No. 14463e, 1963.
Katsuda et al., Chem. Abs. Vol. 52, No. 20880d.

*Primary Examiner*—A. Louis Monacell
*Assistant Examiner*—Gary M. Nath
*Attorney*—Connolly & Hutz

[57] ABSTRACT

A process for producing citric acid by aerobically fermenting an aqueous carbohydrate-containing nutrient medium with certain yeast strains.

7 Claims, No Drawings

FERMENTATION PROCESS FOR THE PRODUCTION OF CITRIC ACID

This application is a continuation application of Ser. No. 690,375, filed Dec. 14, 1967, now abandoned.

BACKGROUND OF THE INVENTION

This invention relates to a process for the production of citric acid by fermentation. In particular it relates to a process for the production of citric acid which comprises selecting a suitable citric acid-accumulating yeast strain, propagating the strain in an aqueous carbohydrate-containing nutrient medium, and recovering therefrom the accumulated citric acid.

Because of its ease of assimilation, palatability and low toxicity, citric acid is one of the most widely used acids in the food and pharmaceutical industry. The acid is widely used as an acidulant in beverages and also as an anti-oxidant for inhibiting rancidity in fats and oils. Both the acid and its salts are employed as buffers in the preparation of jams, jellies, and gelatin preparations, and as emulsifiers and stabilizers in various food products.

Most of the world's supply of citric acid is produced by carbohydrate fermentation processes. The microorganisms most commonly used in these processes are selected strains of *Aspergillus niger*. While these fermentation processes with *Aspergillus niger* are attractive, many difficulties are experienced. For example, over a period of time the citric acid-producing nature of the *Aspergillus niger* culture tends to degenerate. Of more importance is the fact that a relatively long period of time, generally more than 7 days, is required for the production of large quantities of citric acid by fermentation with *Aspergillus niger*. This long fermentation time is one of the major factors responsible for the high cost of producing citric acid. Thus it is obvious that the development of a rapid fermentation process for the production of citric acid is of considerable commercial importance.

We have now surprisingly discovered that certain yeast strains of the genera *Candida*, *Endomycopsis*, *Torulopsis*, *Hansenula*, and *Pichia* have the ability to accumulate substantial amounts of citric acid during the aerobic fermentation of aqueous carbohydrate-containing media. Furthermore, we have also found that there yeast strains will accumulate even larger amounts of citric acid, when various halogen-containing agents are included in the fermentation medium. It has been reported by M. Ogur et al., in Biochemical and Biophysical Research, 14, 193 (1964), that certain strains of Saccharomyces are capable of accumulating citrate, but the levels reported (mere milligrams per liter) are insignificant and of no commercial interest.

It has been found that the yeast strains of the above-specified genera produce substantial amounts of citric acid in remarkably short periods of time during the aerobic fermentation of aqueous carbohydrate-containing media. The present invention now provides a rapid fermentation process for the production of citric acid.

SUMMARY OF THE INVENTION

This invention comprises a process for the production of citric acid by aerobically fermenting an aqueous carbohydrate medium with a yeast.

In particular this invention describes a fermentation process for producing citric acid which comprises fermenting an aqueous carbohydrate-containing medium with a citric acid accumulating yeast strain selected from such genera as *Candida*, *Endomycopsis*, *Hansenula*, *Pichia*, and *Torulopsis*.

This invention further provides a process for enhancing the production of citric acid during the aerobic fermentation of an aqueous, carbohydrate-containing medium with a citric acid accumulating yeast, which comprises including an effective amount of a halogen-containing agent in the fermentation medium.

In particular, this invention provides a process for producing citric acid by aerobically fermenting an aqueous carbohydrate-containing medium that includes a halogen-containing agent such as an $\alpha$-chloro- or $\alpha$-fluoro-substituted lower alkanoic mono- or dicarboxylic acid, or the corresponding amide or salt thereof, with a citric acid-accumulating yeast strain selected from the genera consisting of *Candida*, *Endomycopsis*, *Torulopsis*, *Hansenula* and *Pichia*.

DESCRIPTION OF THE INVENTION

In classifying the yeasts of the present invention, the classification systems described in "The Chemistry and Biology of Yeasts", edited by A. H. Cook, Academic Press, Inc., New York, 1958 and "The Yeasts. A Taxonomic Study", J. Lodder and N.J.W. Kreger-van Rij, North Holland Publ., Amsterdam, 1952 have been followed.

We have now surprisingly found that certain strains of yeasts, in particular osmophilic yeast strains, have the ability to accumulate citric acid during the fermentation of aqueous, carbohydrate, containing media.

In particular, we have found that many yeasts will produce substantial amounts of citric acid, viz, more than one gram per liter of medium, during the aerobic fermentation of aqueous carbohydrate-containing media.

Among others, individual yeast strains belonging to the following genera have been shown to accumulate such amounts of citric acid during the aerobic fermentation of aqueous carbohydrate-containing media: *Candida*, *Endomycopsis*, *Torulopsis*, *Hansenula*, and *Pichia*.

In addition, we have also found that we can enhance the amount of citric acid accumulated during fermentation by incorporating a halogen-containing agent in the fermentation medium. Although at the present time it is not fully understood how these agents cause the increase in citric acid to occur, such an understanding is not essential in order to practice the invention.

The halogen-containing agents comprise various halogenated organic compounds. Among those that have been found to be particularly effective are the $\alpha$-chloro-and $\alpha$-fluoro-substituted lower alkanoic mono- and dicarboxylic acids and their water-soluble salts and amides.

Of these we prefer trichloroacetic acid, trifluoroacetic acid, chloroacetic acid, fluoroacetic acid, chlorosuccinic acid and their respective salts and amides. $\alpha$-Halogenated mono- and dicarboxylic acids containing up to four carbon atoms and their salts and amides are effective in causing an increase in the accumulation of citric acid during the aerobic fermentation of aqueous carbohydrate-containing media by citric acid-accumulating yeasts when they are incorporated in the fermentation medium.

Of course, esters or other derivatives which are readily converted to the respective acid or salt, either by the microorganisms themselves, or by reaction with the medium can also be employed. Thus when $\alpha$-halogenated esters are used, even a partial hydrolysis in the medium furnishes sufficient $\alpha$-halogenated acid to give the desired effect of increasing the amount of citric acid accumulated during the fermentation.

It should be further observed, that whereas water-soluble salts are specified, most salts will fulfill this definition at the levels and pH that are employed. Typical salts which may be employed include the sodium, potassium, ammonium, lithium, calcium, barium, and amine addition salts.

The process of the present invention is conveniently carried out by first preparing an inoculum of the appropriate yeast. A portion of the inoculum is then added to the aqueous fermentation medium, which contains conventional nutrients, e.g., an assimilable source of nitrogen, carbohydrate, and preferably calcium carbonate. The fermentation is then shaken aerobically at a temperature of 20° to 37°C., with a temperature of 25°C. being preferred, until citric acid accumulates in the medium. Excellent results are often obtained in as little as 40 to 72 hours.

It is preferred to maintain the pH of the medium from about 1.5 to 8.0 during the fermentation with a pH range of about 2 to 7 being preferred, during the course of the fermentation.

As the citric acid forms during the fermentation, it reacts with the calcium carbonate yielding insoluble calcium citrate, which separates from the fermentation medium, and carbon dioxide, some of which is assimilated by the propagating yeast cells.

In those cases where substantial amounts of citric acid are produced, the acid is generally isolated as the insoluble calcium citrate by methods well known to those in the art. The outstanding advantage of the instant fermentation process over those previously used for the production of citric acid is its simplicity and rapidity.

The yield of citric acid is found to improve considerably when effective amounts of the previously indicated halogen containing agents are included in the fermentation medium.

The yeast inoculum may be prepared by propagating the yeast cells from a slant for about 24 hours under aerobic conditions in an aqueous fermentation medium containing an assimilable carbohydrate, generally glucose; an assimilable nitrogen source, preferably peptone; yeast extract; and sodium chloride. The broth is usually agitated at room temperature during the fermentation, and the final pH of the medium at the end of the 24 hour period is usually about 4.5. The rate of growth of the yeast cells is periodically determined by centrifuging the broth for 15 minutes at about 2000 g. Generally, a yeast cell density (spindown) of 0.5 ml. of yeast cells per 15 ml. of broth is preferred before the broth is used for inoculation.

After agitating the above inoculation culture at room temperature for about 24 hours, a portion of it is added to the aqueous fermentation medium, which contains a carbohydrate and source of assimilable nitrogen. We prefer such carbohydrates as potato or corn starch, molasses, sucrose, glucose, maltose, dextrin, fructose, and galactose. Because of its availability and low cost we generally prefer to use a molasses as the carbohydrate source, and we use amounts equivalent to as much as 50 percent by weight of sugar. Where higher concentrations of sugar are used, it is preferred to conduct the fermentation with an osmophilic yeast strain.

A further highly significant advantage of the process of the present invention lies in the fact that pretreatment of the molasses for metal ion control is unnecessary. As is well known, prior art citrate fermentations which utilize molasses are ordinarily sensitive to the metal ion contaminants and require that the molasses be pretreated and appropriately purified before use. See for example, D. S. Clark, Industrial and Engineering Chemistry Product Research and Development, 1, 59 (1962).

As an available nitrogen source, such nitrogen-containing organic materials as wheat bran, soybean meal, urea, amino acids, peptones, and enzymatically digested proteins, can be used. We have found the commercially available product YTT, a casein peptone source available from the Sheffield Chemical Co., Norwich, New York to be a convenient source of assimilable nitrogen. We generally use from 1 to 20 g. of this peptone source per liter of medium. Inorganic compounds may also serve as sources of assimilable nitrogen. Of these we prefer ammonium nitrate, ammonium sulfate, and ammonium chloride.

The following mineral cations and anions are also considered beneficial for the growth of the yeasts: sodium, potassium, cobalt, phosphate, and sulfate. It is well known that trace amounts of various vitamins such as biotin also play a role in cell growth. Most of these trace vitamins and essential minerals are present as impurities in the crude nitrogen and carbon sources, and consequently it is not usually necessary to add them individually to the fermentation medium. Calcium carbonate also promotes the growth of the yeast cells and is generally added to the medium.

The fermentation is allowed to proceed aerobically, usually for about 40 to 72 hours, with agitation, at a temperature from about 20° to 37°C., although a temperature of about 25°C. is preferred. While any form of aerobic incubation is satisfactory, controlled aeration, as for example agitation under air, or passing air through the fermentation medium, is generally employed. Although we prefer to carry out the fermentation aerobically, it is also possible to perform it under anaerobic conditions using an oxidizer other than oxygen as the terminal hydrogen acceptor.

During the course of the fermentation the pH of the medium is maintained anywhere from about 1.5 to 8.0, although a pH range of about 2.0 to 7.0 is preferred. We have found that during the initial stages of the fermentation the pH should preferably not be too low, e.g., not less than about 3.0, otherwise there will be insufficient yeast growth. When, however, sufficient yeast growth has been established, the pH is then maintained within the limits given above.

When substantial amounts of citric acid are produced, the acid may be isolated from the fermentation medium by various methods well known to those skilled in the art. As mentioned above, we generally prefer to incorporate calcium carbonate in the fermentation medium, usually an amount of from 5 to 25 g. per liter of fermentation medium. As the citric acid forms, it reacts metathetically with the calcium carbonate, yielding carbon dioxide and insoluble calcium citrate, which can be conveniently removed from the fermentation medium. It appears that some of the liberated carbon dioxide is metabolized by the yeast cells and thus promotes their growth in the medium. Instead of $CaCO_3$, one can also use $BaCO_3$, BaO, CaO, NaOH and KOH.

It should be understood that when reference is made herein and in the claims to recovering citric acid from the medium, this expression is intended to embrace recovery in the form of a salt, such as the calcium salt, as well as recovery as citric acid per se. The salts can be conveniently converted to the free acid by methods well known to those skilled in the art.

As previously mentioned, it has been found that the addition of certain halogen-containing agents, e.g., fluoroacetate and fluoroacetamide, to the fermentation medium leads to improved yields of citric acid. In most cases as little as 5 to $10 \times 10^{-4}$ moles of halogen-containing agent/liter of medium is effective in enhancing the yield of citric acid.

In the present invention, a citric acid-accumulating yeast is defined as one which will accumulate at least one gram of citric acid per liter of medium under the fermentation conditions described. The use of a yeast strain that accumulates less than one gram of citric acid per liter of medium is of little or no practical value.

Listed below are the analytical techniques that are used to determine whether or not a yeast strain is capable of accumulating at least 1 gram of citric acid per liter of medium. The analytical methods below are more than accurate enough to detect this amount of citric acid.

In determining whether or not a yeast strain is capable of accumulating such an amount of citric acid, an inoculum of the yeast strain is prepared from an appropriate slant. A portion of the inoculum is then added to the fermentation medium, and the yeast is propagated therein under aerobic conditions at a temperature of about 25° to 28°C. The pH of the medium is maintained at about a pH of 2 to 7. Both the inoculation and fermentation media are sterilized prior to adding the yeast cells, by heating them in a steam autoclave for 20 minutes at 20 p.s.i.g. Although, as noted above, the fermentation process of the instant invention is usually quite rapid, it is prudent in selecting strains to allow the fermentation to proceed for about 3 to 7 days to ensure the detection of all yeast strains capable of a high production potential.

The fermentation medium used for screening is essentially the same one described above. The same carbohydrates previously described may also be used. It is generally preferable to use a carbohydrate that does not contain impurities which may tend to interfere with the assay, although in view of the amount of citric acid being determined, this is not critical and even such crude carbohydrate sources as molasses may be used. We have found Cerelose, a commercially available dextrose obtainable from the Corn Products Sales Co., N.Y., N.Y., a convenient carbohydrate source. A typical fermentation medium useful in screening yeasts for their ability to accumulate citric acid during carbohydrate fermentation would contain the following:

| | Grams/Liter of Medium |
|---|---|
| Cerelose | 150 |
| Peptone (Bacto)' | 15 |
| Yeast Extract' | 5 |
| NaCl | 4 |
| $CaCO_3$ | 10 |
| Tap water | q.s. ad 1 liter |

'Available from the Difco Laboratories, 920 Henry St., Detroit, Mich. 48201.

The resultant medium is sterilized by heating it 20 minutes in a steam autoclave at 20 p.s.i.g. After sterilization the final pH is about 7.4. A series of 300 ml. Erlenmeyer flasks are filled with 25 ml. of the medium and inoculated with yeast cells. After the fermentation has been allowed to proceed for 5 to 7 days, the flasks are removed from the rotary shaker, the pH adjusted to about 1.7 to 2 with hydrochloric acid, and the contents filtered or centrifuged to remove the suspension of yeast cells.

The filtrate or supernatant liquid is then analyzed for citric acid by means of the analytical techniques described below.

METHODS OF ANALYSIS

I. Paper Chromatography

The systems below provide a convenient semi-quantitative means for determining citric acid in the fermentation medium. Concentrations of citric acid even lower than 1 gram per liter of medium, i.e., 1 mg. per ml. of medium, can be readily detected by these chromatographic methods.

1. Solvent System A

This solvent system is a mixture by volume of 80 parts methyl ethyl ketone, 6 parts acetone, 12 parts distilled water and 2 parts formic acid. Citric acid exhibits an Rf of about 0.59 to 0.64 with this system.

2. Solvent System B

This solvent system consists of by volume 1 part formic acid, 2 parts cineole, and 3 parts n-propanol. The Rf of citric acid with this system is about 0.40 to 0.45.

3. Solvent System C

This solvent system consists of a water-saturated formic acid-ether mixture prepared by shaking together in a separatory funnel a mixture consisting of 2100 ml. of ethyl ether, 300 ml. of formic acid, and 275 ml. of water. After shaking, the upper solvent layer is used as the chromatographic solvent. The Rf of citric acid with this system is about 0.30 to 0.35.

A 5 to 10 microliter sample of the fermentation medium, which has been treated as described above is placed on the paper, and the chromatogram run in the usual manner. We generally use Whatman No. 1 paper as the adsorbent and Bromocresol Green as the indicator (prepared by dissolving 0.25 g. of Bromocresol Green in 400 ml. of acetone and adjusting the solution to green color) in these analyses. In all cases an authentic sample of citric acid is run with each chromatogram as a standard.

II. Acetic Anhydride-Pyridine Analysis

This method is described by J. R. Marier and M. Boulet in J. Dairy Sci., 41, 1683 (1958). Because of its simplicity, we generally prefer to use this method to determine quantitatively the amount of citric acid in the medium.

After treating the 25 ml. fermentation medium used in the screening as described above, the filtrate or supernatant is diluted with 0.1 N HCl to 100 ml. Aliquots of this stock solution are then analyzed for citric acid in the manner described in the above article.

III. Gas Chromatography

Another quantitative method for determining citric acid that we have used is a modification of a method described by N. W. Alcock, Anal. Biochem., 33, 2 (1965). This analysis is carried out with an F and M model 500 gas chromatograph fitted with F AND M model 1609 flame ionization detector under the following conditions:

Column—Aluminum, 6' × ¼" packed with 5% DEGA on ABS
Column T—170°C.
Injection port T—260°C.
Detection block T—260°C.
Helium flowrate—10.5 reading on Brooks R-2-15AAA flowmeter
Hydrogen flowrate—8.0 reading on Brooks R-2-15 AAA flowmeter
Air flowrate—12.0 reading on Brooks R-2-15AAA flowmeter
Sample size—5 microliters A standard curve is prepared by first weighing out exactly the following amounts of citric acid: 50, 100, 150, 200 and 300 mg. To each of these samples is added 10 ml. of boron trifluoride dissolved in a small amount of ethanol. The mixture is heated at 90° for 10 minutes and cooled. Each sample is added to a separatory funnel containing a mixture of 10 ml. of distilled water and 4 ml. of chloroform and vigorously shaken for 30–40 seconds. The lower chloroform layer is serrated and added to a teflon-lined, screw-capped 10 ml. test tube. The aqueous phase in the separatory funnel is extracted with two 3-ml. portions of chloroform which are also added to the test tube. A 5 microliter portion of each sample is injected into the chromatograph and a standard curve is prepared by plotting the amount of citric acid as abscissa and the corresponding peak areas of the chromatogram as ordinate. The determination of the peak areas are conveniently calculated by means of an integrator attached to the Gas Chromatograph.

A sample of the fermentation medium is then taken, the pH adjusted to about 2.0 with concentrated hydrochloric acid, and the mixture either centrifuged or filtered to remove suspended matter. To 5 ml. of the clear solution is added 20 ml. of 2,2-dimethoxypropane. The resultant solution is then evaporated to dryness on an open water bath, set at 60°–80°C. To the dry residue is added 10 ml. of boron trifluoride in methanol. This solution is treated exactly in the same manner as the standard above. The amount of citric acid in the sample is readily calculated by comparison with the standard curve.

While in the present invention I have described the use of a particular group of halogenated organic compounds to enhance the accumulation of citric acid during the fermentation, other halogenated organic compounds with this ability may also be found.

It is to be further understood that the process of the present invention also embraces the use of yeast mutants or variants produced by various chemical and physical means, provided, of course, that they exhibit the specified citric acid-accumulating ability. Such mutants are produced by techniques such as X-ray and UV radiation; treatment with nitrogen mustards and organic peroxides; and other similar techniques well known to those skilled in the art.

In addition, the use of subcultures, natural mutants, variants and the like, is contemplated in carrying out the process of the present invention.

The following examples are provided to more fully illustrate the present invention, but are not to be construed as limiting the scope thereof.

PREPARATION OF INOCULUMS

A slant containing yeast cells is transferred to a liquid medium prepared from 150 g. of Cerelose, available from Corn Products Sales Co., N.Y., N.Y. 10022, 15 g. of peptone, 5 g. of yeast extract, 4 g. of sodium chloride, and 1 liter of water. The yeast cells are incubated aerobically with agitation at room temperature for 24 hours. At the end of this time, the pH is about 4.5. The yeast cell content of the medium (spindown) is determined by centrifuging a 15 ml. sample of the medium at 2000 g. for 15 minutes. When a yeast cell density of 0.5 ml. of yeast cells per 15 ml. of fermentation medium is realized, the spore suspension is used to inoculate the appropriate fermentation medium.

EXAMPLE I

Several ml. of 24 hour-old inoculum, of the citric acid accumulating yeast Candida guilliermondii ATCC No. 9058 prepared as described above, are added to an aqueous, sterilized nutrient medium containing per liter of medium the following ingredients: 150 g. of Cerelose; 10 g. of calcium carbonate; 4 g. of sodium chloride; 5 g. of Yeast Extract (obtained from the Difco Laboratories, 920 Henry St., Detroit, Mich. 48201); and 15 g. of Peptone (Bacto obtained from the Difco Laboratories).

The fermentation medium is shaken aerobically at 28°C. for 5 days. The yield of citric acid, recovered in the form of the insoluble calcium citrate followed by acidification, is 16 to 17 g. per liter.

EXAMPLE II

When the fermentation described in Example I is repeated at about 37°C., instead of 28°C., substantially the same results are obtained.

EXAMPLE III

When the fermentation described in Example I is repeated at about 20°C. and for a longer period of time, e.g., about 7–9 days, substantially the same results are obtained.

EXAMPLE IV

Examples I to III are repeated using an aqueous nutrient medium containing the following ingredients per liter of medium:
an amount of Cane Black Strap Molasses equivalent to about 150 g. of glucose, calcium carbonate                5 g.,
YTT                              1 g.

YTT is a commercial source of nitrogen available from the Sheffield Chemical Co., Norwich, New York, and comprises peptones obtained from the degradation of casein.

After shaking the fermentation medium aerobically at room temperature for about 5 days, about 15–16 g. of citric acid is obtained.

EXAMPLE V

The procedures of Examples I to III can be repeated, with substantially the same results, using an equivalent amount of the following carbohydrates in place of the Cerelose:

| | |
|---|---|
| corn starch | dextrin |
| potato starch | glucose |
| maltose | fructose |
| sucrose | galactose |

EXAMPLE VI

The procedures of Examples I to III can be repeated, with substantially the same results, utilizing an equivalent amount of the following assimilable nitrogen sources instead of the Difco peptone:

| | |
|---|---|
| soybean meal | urea |
| cotton seed meal | ammonium chloride |
| enzymatically digested protein | ammonium sulfate |
| amino acids | ammonium nitrate |

EXAMPLE VII

The fermentation in Example I is repeated with 0.10 g. of sodium fluoro-acetate ($1 \times 10^{-3}$ moles) being added to the fermentation medium.

The yield of citric acid recovered after 5 days is about 20 to 21 grams.

EXAMPLE VIII

When the fermentation described in Example VII is repeated, replacing the sodium fluoroacetate with an equivalent amount ($1 \times 10^{-3}$ moles) of the following compounds, substantially the same results are obtained:
fluoroacetic acid
fluoroacetamide
potassium fluoroacetate
barium fluoroacetate

EXAMPLE IX

In Table I are listed the results obtained when inoculums of the indicated yeast strain, prepared as described above, are used to ferment the following fermentation medium:

| | Grams |
|---|---|
| Cerelose | 150 |
| Peptone (Bacto-Difco) | 15 |
| Yeast extract (Difco) | 5 |
| NaCl | 4 |
| CaCO$_3$ | 10 |
| Tap water q.s. ad | 1000 ml. |

The medium is sterilized for 20 minutes at 20 p.s.i.g. prior to inoculation, with the pH of the medium after sterilization being about 7.4.

Table I shows the increase in yield of citric acid obtained when 0.10 g. of sodium fluoroacetate is included in the fermentation medium.

TABLE I

| Yeast strain | Public[1] culture depository number | Fermentation[2] time, days | Citric acid gms./liter of med.[3] Sodium fluoroacetate present | Sodium fluoroacetate absent |
|---|---|---|---|---|
| Endomycopsis capsularis | ATCC 20033 | 5 | 10.00 | 9.25 |
| Hansenula anomala | ATCC 20029 | 7 | 8.35 | 6.30 |
| Endomycopsis chodati | ATCC 20030 | 5 | 8.35 | 7.90 |
| Torulopsis sp | ATCC 20031 | 7 | 12.00 | 10.25 |
| Candida parapsilosis | ATCC 7333 | 5 | 10.10 | 8.60 |
| Candida albicans | ATCC 752 | 7 | 14.00 | 9.00 |
| Pichia fermentans | NRRL Y-1619 | 7 | 1.00 | 0.94 |
| Candida pulcherrima | ATCC 9889 | 7 | 4.14 | 3.86 |

[1] ATCC: American Type Culture Collection, Washington, D.C.; NRRL: Northern Regional Research Laboratories, Culture Collection Section, Fermentation Div., Peoria, Ill.
[2] Fermentations are conducted under aerobic conditions at 28° C.
[3] Method of analysis: Acetic anhydride-pyridine method previously described.

EXAMPLE X

The same medium described in Example IX is again used, except that only 5 g. of CaCO$_3$ are employed, in carrying out the fermentations indicated in Table II. These fermentations were allowed to proceed for 3 days.

TABLE II

| Yeast strain | Public culture depository number[1] | Citric Acid, gms./liter of medium[2] Sodium fluoroacetate present | Sodium fluoroacetate absent |
|---|---|---|---|
| Candida guilliermondii var. membranaefaciens | NRRL 2080 YM53 | 7.8 | 3.5 |
| Candida reukaufii | CBS 1903 | 5.0 | 3.0 |
| Candida lipolytica | NRRL 1094 | 30.3 | 19.3 |
| Torulopsis magnoliae | ATCC 12573 | 18.5 | 3.5 |

[1] ATCC: American Type Culture Collection, Washington, D.C.; NRRL: Northern Regional Rexearch Laboratories, Culture Collection Section, Fermentation Div., Peoria, Ill.; CBS: Centraalbureau voor Schimmelculture, Boarn, Holland.
[2] Method of analysis: Acetic anhydride-pyridine method.

EXAMPLE XI

When the sodium fluoroacetate in Examples IX and X are replaced with an equivalent amount of the following compounds, substantially the same results obtained in Tables I and II are obtained:
fluoroacetic acid
potassium fluoroacetate
fluoroacetamide
barium fluoroacetate

EXAMPLE XII

When the fermentations described in Examples IX and X are repeated with equivalent amounts of the following carbohydrates instead of Cerelose, substantially the same results are obtained:

| | |
|---|---|
| corn starch | dextrin |
| potato starch | glucose |
| maltose | fructose |
| sucrose | galactose |

EXAMPLE XIII

The data in Table III illustrates the results obtained when other halogenated organic compounds are included in the fermentation medium.

The yeast strain used was a typical citric acid-accumulating *Candida guilliermondii*.

| Fermentation medium | |
|---|---|
| Blackstrap molasses | 300 g. |
| $(NH_4)_2 SO_4$ | 4 g. |
| $CaCO_3$ | 10 g. |
| Tap water q.s. ad | 1000 ml. |

The pH was adjusted to 6.2, and the fermentation was conducted aerobically at 28°C. for 5 days.

TABLE III

| Halogenated Organic Compound | Concentration of Halogenated Compound, Gms./liter | Yield of Citric Acid, Gms./liter |
|---|---|---|
| None | | 12 |
| Sodium chloroacetate | 0.05 | 15 |
| Sodium chloroacetate | 0.10 | 14 |
| Sodium chloroacetate | 0.20 | 14 |
| Trifluoroacetic acid | 0.05 | 15 |
| Trifluoroacetic acid | 0.10 | 14 |
| Trifluoroacetic acid | 0.20 | 14 |

EXAMPLE XIV

When the fermentations described in Example XIII are also carried out with the following halogen-containing agents, substantially the same results are obtained:

| | |
|---|---|
| chloroacetic acid | sodium chlorosuccinate |
| chloroacetamide | sodium trifluoroacetate |
| potassium chloroacetate | trifluoroacetamide |
| chlorosuccinic acid | barium trifluoroacetate |

EXAMPLE XV

In Table IV are listed the results obtained when inoculums of the indicated yeast strains, prepared as described above, are used to ferment the following medium:

| | |
|---|---|
| Invert molasses[1] | 200 g. |
| YTT peptone[2] | 5 g. |
| Corn steep liquor | 1 g. |
| $CaCO_3$ | 10 g. |
| Tap water q.s. ad 1000 ml. | |

[1] A typical analysis of this material is given:
| | |
|---|---|
| Sucrose | 24.23% |
| Reducing sugars | 53.87% |
| Total sugars | 78.10% |
| Brix | 85.00 at 3 hrs. |
| Baume, modulus 145 44.86 at 3 hrs. | |

[2] Obtained from the Sheffield Chemical Co., Norwich, N.Y.

After sterilization of the medium, the pH is about 6.0–6.5

A series of 300 ml. Erlenmeyer flasks were filled with 25 ml. of the above medium and inoculated with the yeast strain. The fermentations were allowed to proceed aerobically with shaking for 7 days at 28°C.

The analyses were performed semi-quantitatively by means of the paper chromatographic systems A and C previously described. Solutions containing known amounts of citric acid were used as comparison standards to estimate the amount of citric acid in the fermentation media.

TABLE IV

| | | Estimated Amount of Citric Acid in the Medium, g./100 ml. Paper Chromatographic System | |
|---|---|---|---|
| Yeast Strain | ATCC Culture No. | A | C |
| Endomycopsis capsularis | 20033 | 2.0 | 2.0 |
| Endomycopsis chodati | 20030 | 1.0 | 1.0 |
| Pichia fermantans | (NRRL - Y-1619) | 2.0 | 1.5 |
| Torulopsis sp. | 20031 | 2.0 | 2.0 |
| Candida albicans | 20032 | 2.0 | 2.5 |
| albicans | 752 | 1.5 | 1.5 |
| albicans | 753 | 1.5 | 1.5 |
| albicans | 2091 | 0.8 | 0.8 |
| albicans | 10259 | 1.0 | 1.0 |
| albicans | 10261 | 1.5 | 1.5 |
| albicans | 11651 | 0.8 | 0.8 |
| albicans | 14053 | 1.5 | 1.5 |
| brumptii | 10564 | 0.5 | 0.5 |
| catenulata | 10565 | 1.0 | 1.0 |
| curvata | 10567 | 0.5 | |
| flareri | 9375 | 1.0 | 1.0 |
| guilliermondii | 9390 | 0.8 | 0.8 |
| guilliermondii | 14242 | 1.0 | 1.0 |
| guilliermondii | 9058 | 3.0 | |
| guilliermondii | (NRRL 324) | 2.0 | |
| guilliermondii var. membranaefaciens | (NRRL 2080) | 3.0 | |
| guilliermondii var. membranaefaciens | 9766 | 1.5 | 1.5 |
| japonica | 14437 | 0.5 | |
| krusei var. saccharicola | 16047 | 0.5 | 0.5 |
| Candida krusoides | 7345 | 1.0 | 0.8 |
| krusoides 10755 | 10755-6 | 0.8 | 0.5 |
| lipolytica | 8662 | 4.0 | |
| lipolytica (mixed culture) | 8661 | 4.0 | |
| lipolytica isolate 19687-1 | 8661 | 4.0 | |
| lipolytica isolate 19687-2 | 8661 | 4.0 | |
| melinii | 10568 | | 0.5 |
| monosa | (NRRL Y-1079) | 0.5 | 1.0 |
| monosa | 2146 | 0.7 | 0.7 |
| monosa | 9330 | 0.5 | 0.7 |
| mycoderma | 9888 | 1.0 | 1.5 |
| parapsilosis | 7330 | 1.0 | 1.5 |
| parapsilosis | 7333 | 1.0 | 1.5 |
| parapsilosis | 7336 | 1.0 | 1.5 |
| parapsilosis | 10265 | 0.7 | 0.5 |
| pelliculosa | 2149 | 1.0 | 0.8 |
| Candida pulcherrima | 7696 | 1.0 | 1.0 |
| pulcherrima | 7697 | 1.5 | 2.0 |
| pulcherrima | 9889 | 1.5 | 2.0 |
| stellatoidea | 11006 | 0.9 | 1.0 |
| tropicalis | 1369 | 1.5 | 1.5 |
| tropicalis | 9968 | 1.5 | 1.5 |
| tropicalis | 14246 | 1.5 | 1.5 |
| zeylaniodes | 4933 | 0.7 | 0.8 |
| zeylaniodes | 7351 | 0.7 | 0.7 |
| zeylaniodes | 10674 | 1.0 | 1.0 |

EXAMPLE XVI

The results in Table V illustrate the enhancement in citric acid accumulation that is obtained when various yeast strains are propagated in the fermentation medium of Example XV when that medium contains a concentration of 0.05 g. of sodium fluoroacetate per liter of medium.

The conditions under which the fermentations are carried out and the method of analyses are identical with those of Example XV.

When equivalent amounts of the compounds below are used in place of the sodium fluoroacetate, substantially the same results are obtained:

barium fluoroacetate
potassium fluoroacetate
fluoroacetic acid
fluoroacetamide

TABLE V

| | | Estimated citric acid in the Medium, g./100 ml. | | | |
|---|---|---|---|---|---|
| | | Sodium Fluoroacetate Present 0.05 g./liter | | Sodium Fluoroacetate Absent | |
| Yeast Strain | ATCC Culture No. | Paper Chromatographic System | | Paper Chromatographic System | |
| | | A | C | A | C |
| Canida albicans | 752 | 2.0 | 2.0 | 1.5 | 1.5 |
| albicans | 753 | 2.0 | 2.0 | 1.5 | 1.5 |

| | | | | | |
|---|---|---|---|---|---|
| albicans | 2091 | 1.0 | 1.0 | 0.8 | 0.8 |
| albicans | 10261 | 2.0 | 2.0 | 1.5 | 1.5 |
| albicans | 11651 | 1.0 | 1.0 | 0.8 | 0.8 |
| albicans | 14053 | 2.0 | 2.0 | 1.5 | 1.5 |
| curvata | 10567 | 0.8 | | 0.5 | |
| guilliermondii | 9390 | 1.0 | 1.0 | 0.8 | 0.8 |
| guilliermondii var. membranae- faciens | 9766 | 2.0 | 2.0 | 1.5 | 1.5 |
| kruseides 10755 | 10755-6 | 1.5 | 1.5 | 0.8 | 0.5 |
| parasilosis | 7333 | 1.5 | | 1.0 | |
| parasilosis | 7336 | 1.5 | | 1.0 | |

I claim:

1. A process for producing citric acid which comprises propagating a citric acid-accumulating yeast strain of a genus selected from the group consisting of *Candida*, *Endomycopsis*, *Torulopsis*, *Hansenula*, and *Pichia* under aerobic conditions in an aqueous carbohydrate-containing medium until a level of at least about 1 gram of citric acid accumulates per liter of said medium, and recovering said citric acid.

2. The process of claim 1 wherein said yeast is a *Candida* strain.

3. The process for producing citric acid which comprises propagating a citric acid-accumulating yeast strain of the genus *Torulopsis* under aerobic conditions in an aqueous carbohydrate-containing medium until a level of at least about 1 gram of citric acid accumulates per liter of said medium, and recovering said citric acid.

4. The process for producing citric acid which comprises propagating a citric acid-accumulating yeast strain of the genus Candida under aerobic conditions in an aqueous medium containing molasses as the principal carbohydrate source and containing calcium carbonate, and maintaining a pH between about 1.5 and 8 and a temperature between about 20° and 37°C. during said propagating, until a level of at least about 1 gram of citric acid accumulates per liter of said medium, and recovering said citric acid.

5. The process for producing citric acid which comprises propagating a citric acid-accumulating yeast strain of a genus selected from the group consisting of *Candida*, *Endomycopsis*, *Torulopsis*, *Hansenula*, and *Pichia* under aerobic conditions in an aqueous carbohydrate-containing medium until a level of at least about 1 gram of citric acid accumulates per liter of said medium, said medium also containing an agent selected from the group consisting of $\alpha$-chloro-, and $\alpha$-fluoro-substituted lower alkanoic mono- and dicarboxylic acids and their water-soluble salts and amides.

6. The process of claim 5 wherein said agent is fluoroacetate.

7. The process of claim 5 wherein said agent is fluoroacetamide.

* * * * *

Disclaimer 3,717,549.—*Foy F. Roberts*, Stonington, Conn. FERMENTATION PROCESS FOR THE PRODUCTION OF CITRIC ACID. Patent dated Feb. 20, 1973. Disclaimer filed Oct. 22, 1976, by the assignee, *Pfizer Inc.*
Hereby enters this disclaimer to claims 1 through 7 of said patent.
[*Official Gazette January 11, 1977.*]